United States Patent [19]
Watanabe et al.

[11] Patent Number: 5,583,594
[45] Date of Patent: Dec. 10, 1996

[54] CAMERA HAVING VARIABLE FIELD SHOOTING SIZES

[75] Inventors: Suminori Watanabe, Saitama-ken; Masaharu Hara; Nobuaki Sasagaki, both of Kanagawa-ken, all of Japan

[73] Assignee: Nikon Corporation, Tokyo, Japan

[21] Appl. No.: 378,454

[22] Filed: Jan. 25, 1995

[30] Foreign Application Priority Data

Apr. 22, 1994 [JP] Japan .................................. 6-085083

[51] Int. Cl.⁶ .................................................. G03B 17/02
[52] U.S. Cl. .................................................. 396/435
[58] Field of Search .............................. 354/159

[56] References Cited

FOREIGN PATENT DOCUMENTS

2277164 10/1994 United Kingdom ............... 354/159

Primary Examiner—David M. Gray
Attorney, Agent, or Firm—Oliff & Berridge

[57] ABSTRACT

A shooting size switching camera has a mechanism for varying the size of the shooting field, for example between a standard size and a panorama size. The camera is structured to have an operation member to conduct the switching of shooting size, at least one light shielding member which interlocks with the operation member and which moves with movement of the operation member to switch shooting size, a support member to support the light shielding member in such a manner that the light shielding member is allowed to move, and a first regulation structure to regulate the movement range of the operation member relative to the support member.

29 Claims, 8 Drawing Sheets

CAMERA HAVING VARIABLE FIELD SHOOTING SIZES

BACKGROUND OF THE INVENTION

1. Field of the Invention

The present invention relates to a shooting size switching camera capable of switching shooting size. More specifically, the invention relates to a camera having a mechanism for varying the size of the shooting field, for example between standard size and panorama size.

2. Description of Related Art

Figure 5:
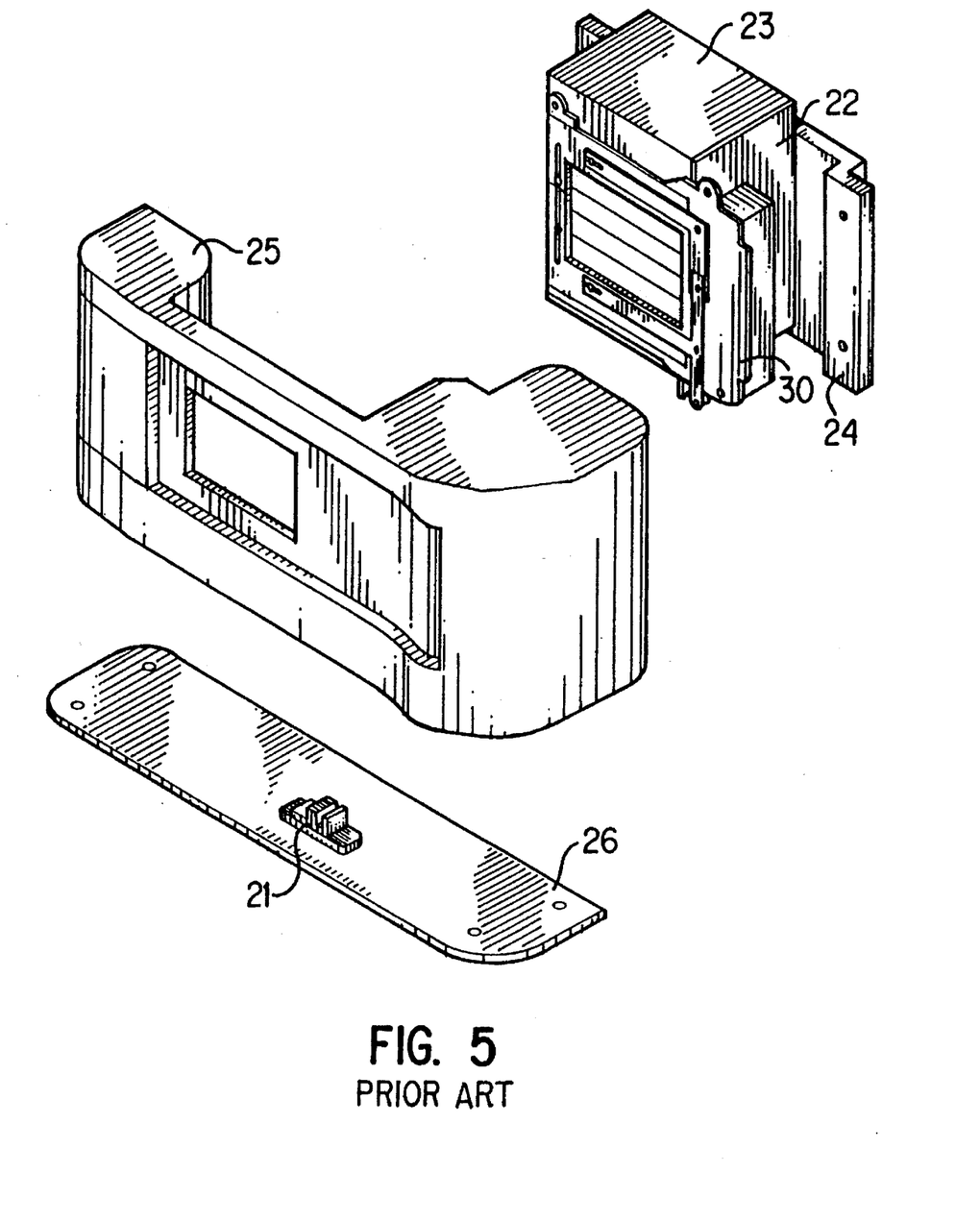
FIG. 5 is a schematic drawing describing conventional technology.
Figure 6:
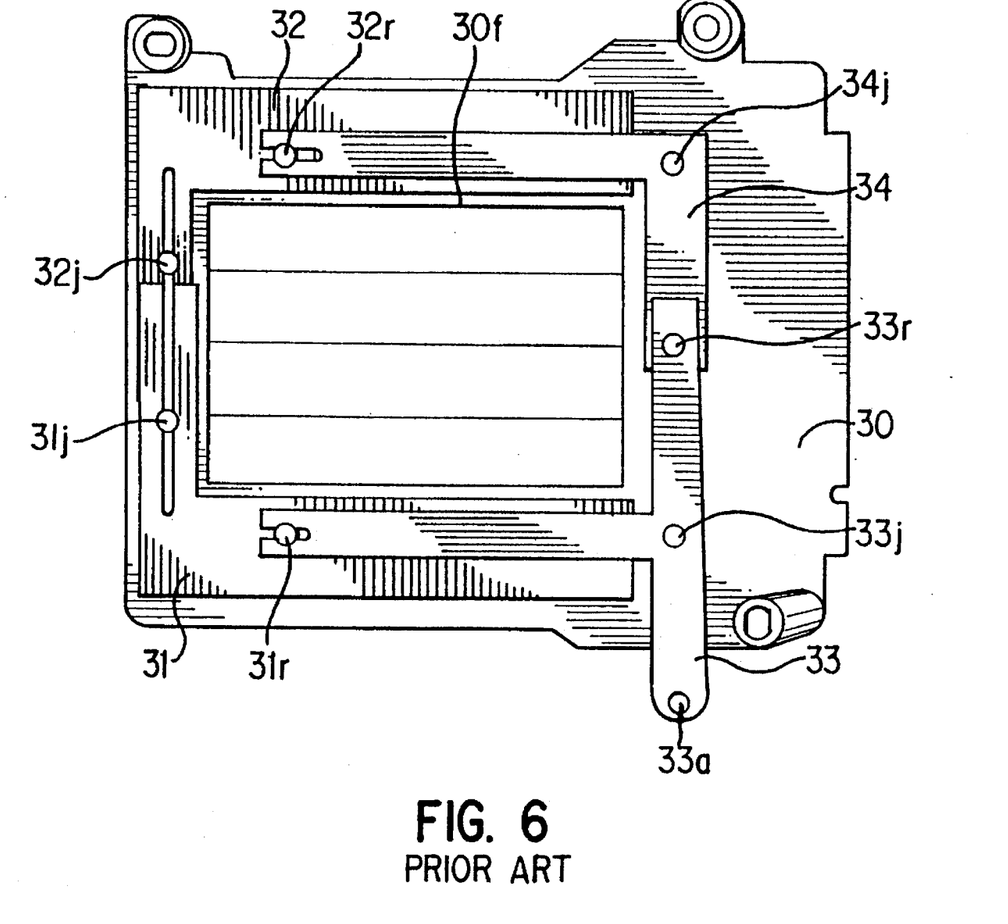
FIG. 6 is a front view of a shutter using conventional technology.
Figure 7:
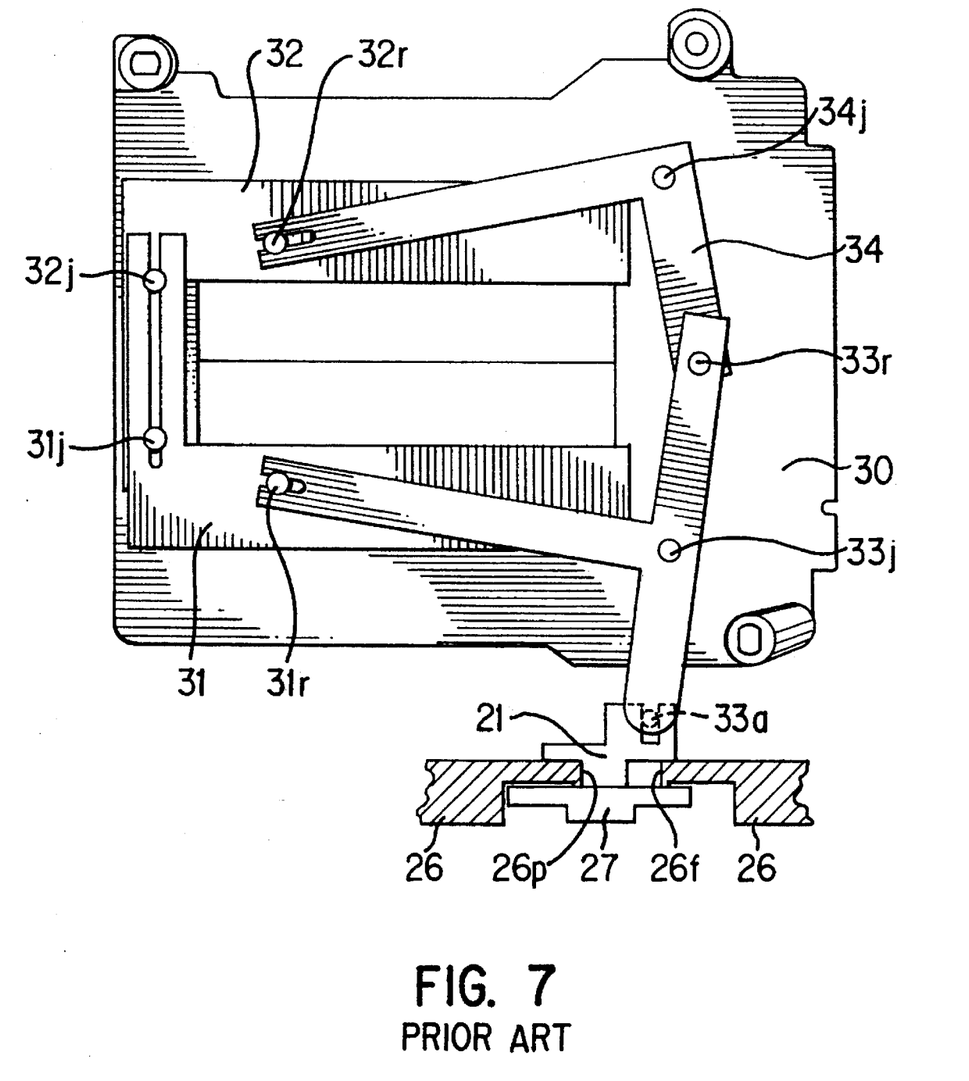
FIG. 7 is a front view of the shutter showing the panorama field shooting state in conventional technology.
Figure 8:
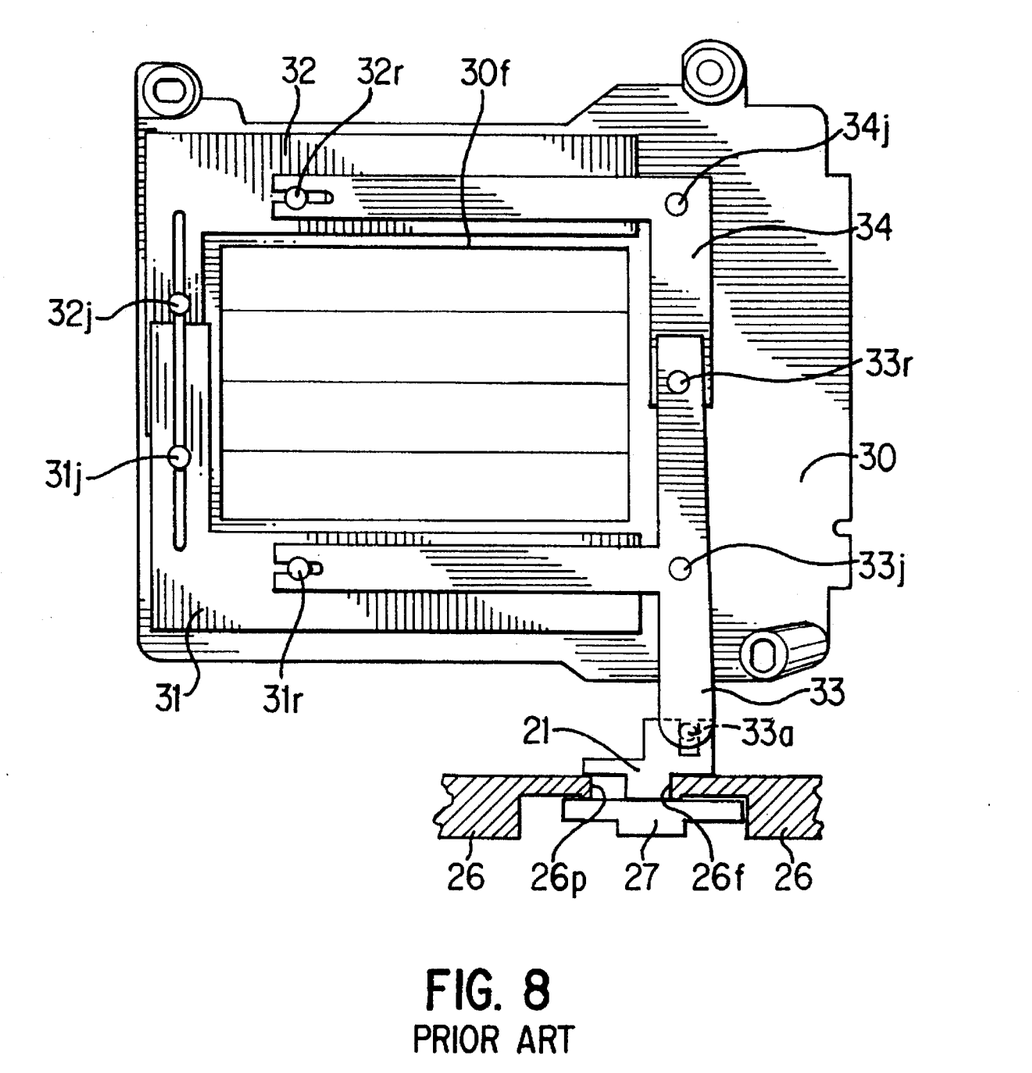
FIG. 8 is a front view of the shutter showing the standard field shooting state in conventional technology.

Conventionally, this type of device comprises the structure described in FIGS. 5–8, FIG. 5 comprising a schematic drawing illustrating a conventional device. FIG. 6 is a front view of a shutter 30 in a conventional device. FIG. 7 illustrates a state in which an interlocking component 21 rests in a regulation unit 26p, explained hereafter. FIG. 8 illustrates a state in which the interlocking component 21 stops in a regulation component 26f, also explained hereafter.

As shown in FIG. 5, the shutter 30 is anchored to an I-board 22 and to a mirror box 23, the I-board 22 and the mirror box 23 are anchored on a front plate 24, and the front plate 24 is anchored on a back body 25. A bottom cover 26 is anchored on the front plate 24 and the back body 25.

As shown in FIG. 6, a standard field frame 30f is formed in the shutter 30 and a panorama lever 33 is joined to a fulcrum pin 33j in such a manner that the lever 33 is allowed to slide. Similarly, the panorama light shielding plate 31 is joined to a fulcrum pin 31j in such a manner that the plate 31 is allowed to slide vertically. A fulcrum pin 31r is anchored on the panorama light shielding plate interlocking with the panorama lever 33. Moreover, a middle lever 34 is joined to a fulcrum pin 34j in such a manner that the lever 34 is allowed to slide and a fulcrum pin 33r is anchored on the panorama lever 33 interlocking with the middle lever 34. The panorama light shielding plate 32 is joined to a fulcrum pin 32j in such a manner that the plate 32 is allowed to slide vertically and a fulcrum pin 32r is anchored on the panorama light shielding plate 32 interlocking with the middle lever 34. An interlocking pin 33a to interlock with the interlocking component 21, explained later, is anchored on the panorama lever 33.

In FIG. 7, an external operation lever 27 is anchored on the interlocking component 21 and is sub-assembled in the bottom cover 26. The movable range of the interlocking component 21 is regulated by the regulation units 26p and 26f provided in the bottom cover 26 and the interlocking pin 33a interlocking with the interlocking component 21. In the state in which the interlocking component 21 is stopped by the regulation unit 26p, the panorama light shielding plates 31 and 32 shield light at the top and the bottom sections of the standard field frame 30f and form the panorama size, establishing the panorama field shooting state.

In FIG. 8, the interlocking component 21 is stopped by the regulation unit 26f. In this state, the panorama light shielding plates 31 and 32 are positioned in the top and bottom sections outside of the standard field frame 30f, hence light is not shielded from inside the standard field frame 30f, establishing the standard field shooting state.

In a conventional device such as described above, the movable range of the interlocking component 21 is regulated and limited by the regulation units 26p and 26f provided in the bottom cover 26. However, the bottom cover 26 and the regulator units 26p and 26f are not secured or positioned relative to the shutter 30 and plates 31,32. Thus, if the positioning of the cover 26 or the regulator units 26p and 26f are assembled misaligned or become misaligned relative to the shutter 30 and plates 31,32, the movement of the plates will not correspond to either the panorama field on the stand and field.

Moreover, the shutter 30 is anchored in the I-board 22 and the mirror box 23, but is not anchored directly on the bottom cover 26. Thus, slippage occurs between the bottom cover 26 and the shutter 30 during assembly, which, in turn, causes slippage between the interlocking component 21 positioned by the regulation units 26p or 26f relative to the shutter 30. Thus, a substantial amount of dislocation occurs in the positions of the panorama light shielding plates 31 and 32.

Therefore, the problem occurs in the panorama field shooting state as described above, that the panorama light shielding plates fail to achieve the formation of an accurate panorama size. Furthermore, in the standard field shooting state, the problem occurs that the panorama light shielding plates 31 and 32, with the dislocation, shield the top and the bottom sections of the standard field frame 30f.

SUMMARY OF THE INVENTION

The present invention has been developed in light of the above-noted problems. It is an objective of the present invention to provide a position regulation device to place panorama light shielding plates in accurate positions.

In order to overcome the above-noted problems, it is an object of the invention to provide a shooting size switching camera equipped with an operation member to switch shooting size; at least one light shielding member which interlocks with the operation member and which moves with movement of the operation member to switch the shooting size; a support member which supports the at least one light shielding member while enabling the movement of the at least one light shielding member; and a first regulation means to regulate the movement range of the operation member relative to the support member.

It is a further object of the invention to provide the shooting size switching camera with a second regulation means to regulate the movement range of the at least one light shielding member wherein the movement range of the at least one light shielding member includes the movement range of the operation member.

It is another object of the invention to provide the second regulation means of the shooting size switching camera comprising at least one aperture provided in the light shielding member and at least one protrusion provided in the support member.

Furthermore, it is another object of the invention to provide the first regulation means of the shooting size switching camera comprising at least one groove provided in the operation member and at least one protrusion provided in the support member.

Another object of the invention is to provide a shooting size switching camera equipped with a shutter for introducing light into the camera, at least one panorama light shield plate for varying the amount of light entering the shutter; a lever for operating the at least one shield plate; an operation member for moving the lever; and a position regulation extending from the shutter and cooperating with the operation member for regulating a movement range of the lever relative to the shutter member is provided in the anchoring member to mechanically stop the interlocking component.

Moreover, another object of the invention is to provide the camera as described in the above with a range regulation member in the shutter to regulate the movable range of the at least one panorama light shield plate, the movable range including the movement range of the at least one panorama light shield plate being at least equal to the range in which the motion of the interlocking component is regulated by the position regulation member.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

An embodiment of the present invention is described hereafter with reference to FIGS. 1–4.

Figure 1:
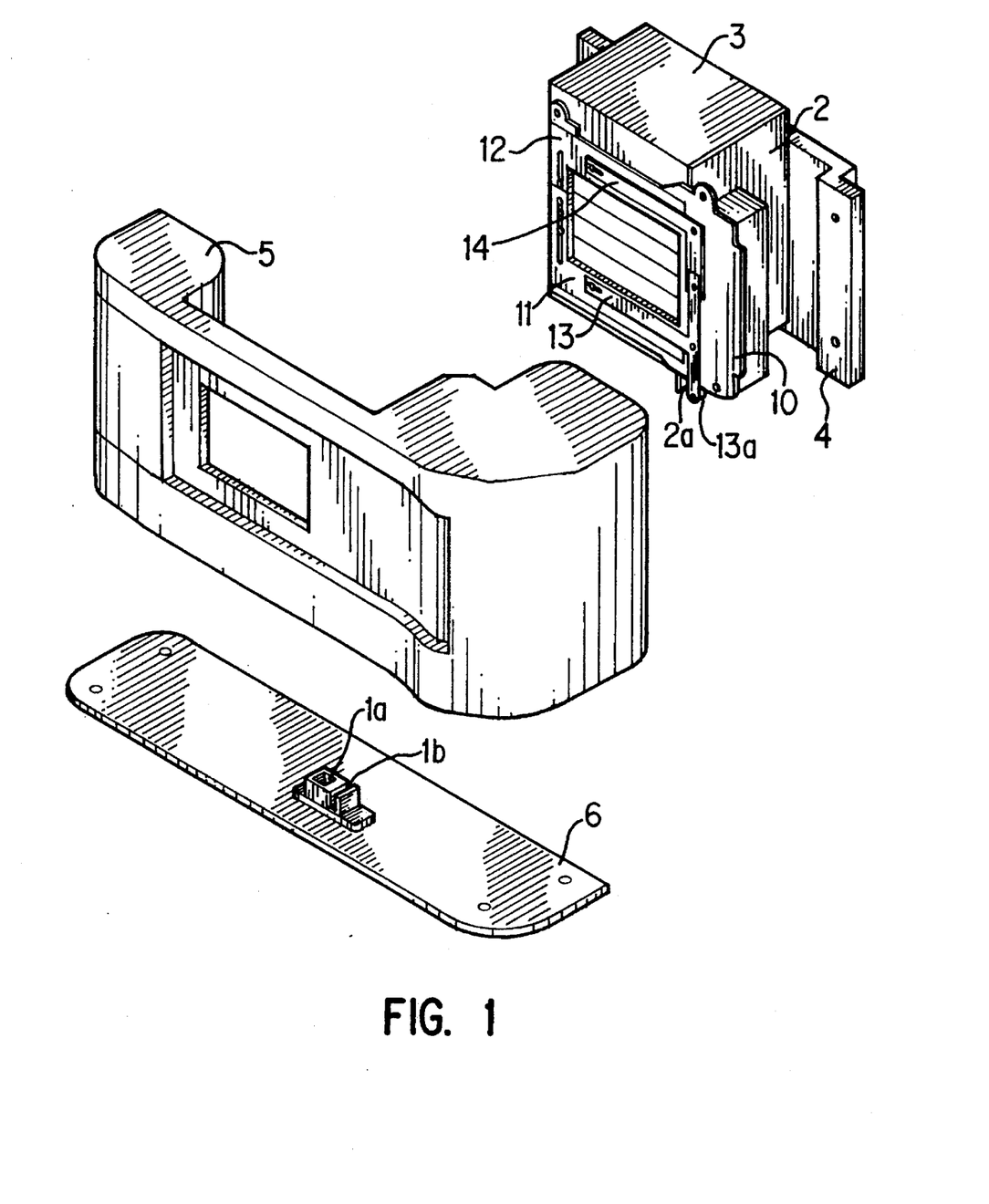
FIG. 1 is a schematic drawing of the present invention showing the external panoramic switching device.
Figure 2:
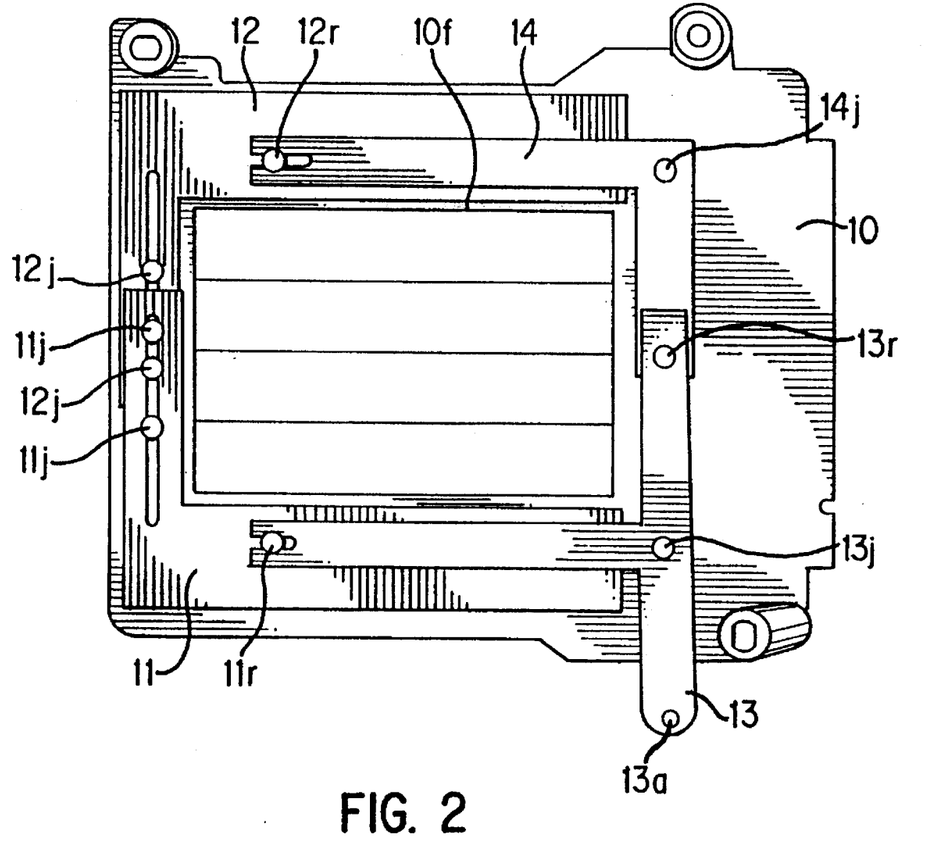
FIG. 2 is a front view of the shutter of the present invention.
Figure 3:
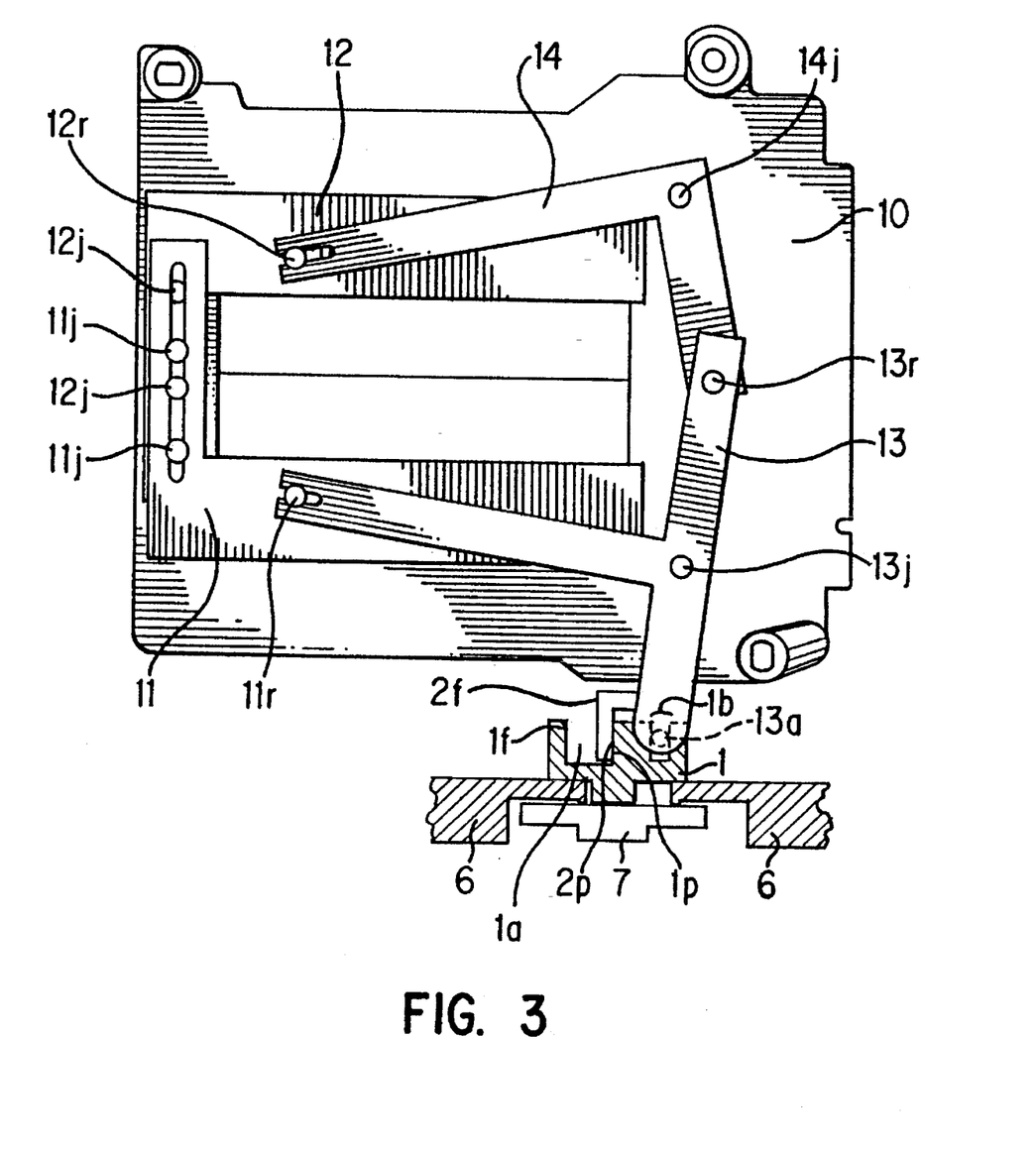
FIG. 3 is a front view of the shutter showing the panorama field shooting state of the present invention.
Figure 4:
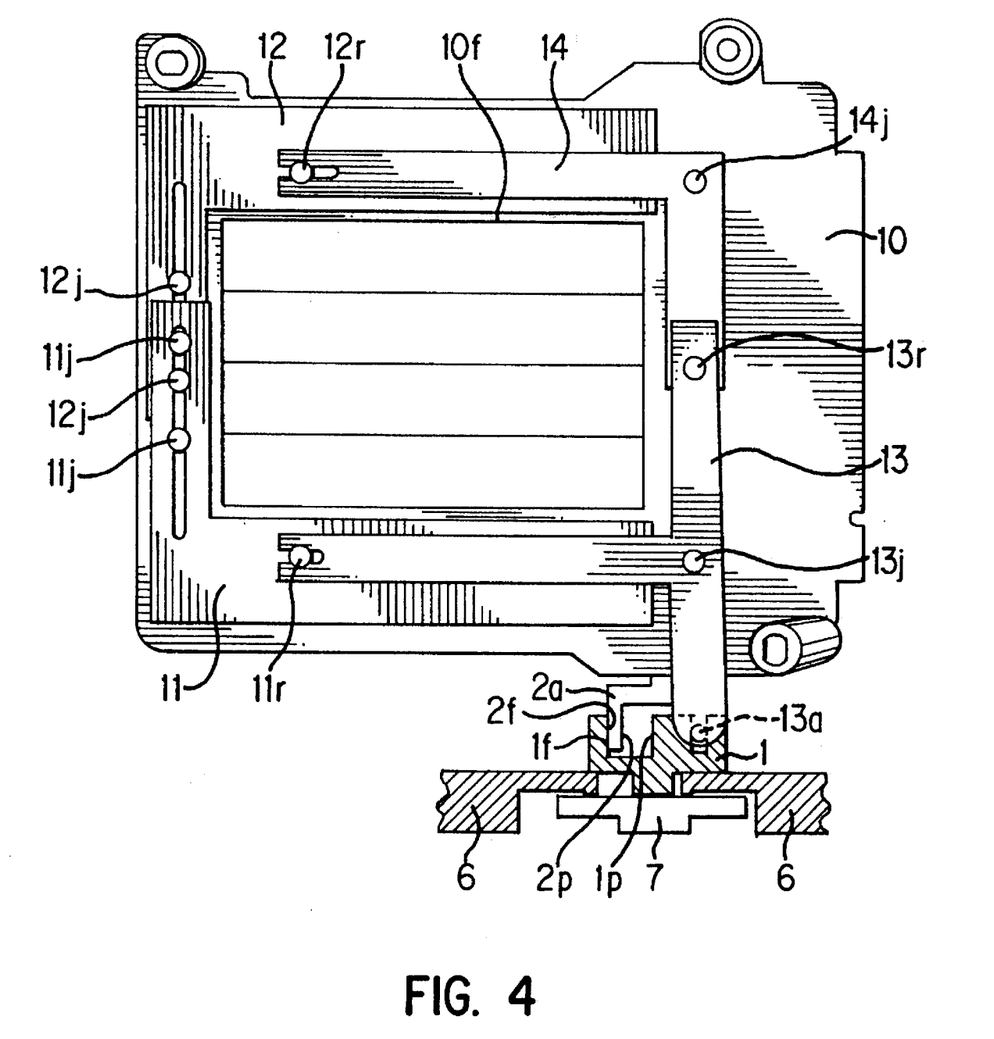
FIG. 4 is a front view of the shutter showing the standard field shooting state of the present invention.

FIG. 1 is a schematic drawing of a structure of a standard panorama external switching device utilizing a position regulation device according to the present invention. FIG. 2 is a front view of the shutter 10. FIG. 3 illustrates a state in which the interlocking component 1 is stopped by a regulation unit 2p, which will be explained later. FIG. 4 illustrates a state in which the interlocking component 1 is stopped by a regulation unit 2f.

In FIG. 1, the shutter 10 is anchored on the I-board 2 and the mirror box 3. The shutter 10 is equipped with the fulcrum pins 11j, 11r, 12j, 12r, 13j, 13r, and 14j. The I-board 2, or support member, and the mirror box 3 are anchored on the front plate 4, which, in turn, is anchored on the back body 5. The bottom cover 6 is anchored on front plate 4 and the back body 5.

An interlocking pin 13a is provided on a panorama lever 13. The pin 13a is inserted in a groove 1b provided in the interlocking component 1. Moreover, a protrusion 2a, provided in the I-board 2, is sub-assembled in such a manner that the protrusion 2a is inserted in a groove 1a provided in the interlocking component 1. The protrusion 2a has first regulators, such as regulation units 2p and 2f (FIG. 3).

In FIG. 2, the standard field frame 10f is formed in the shutter 10. The panorama lever 13 is joined to fulcrum pin 13j so that the lever 13 is allowed to pivot and slide.

A panorama light shielding plate 11 is joined to a fulcrum pin 11j so that the plate 11 is allowed to slide vertically. The sliding range of the panorama light shielding plate 11 is regulated by second regulators such as fulcrum pins 11j within the boundaries of apertures or slots (unlabeled) of the panorama light shielding plate 11.

The fulcrum pins 11j do not act to stop the panorama shielding plate 11 until the interlocking component 1, as explained hereafter, is stopped by the regulation units 2p and 2f. Also, as explained hereafter, fulcrum pin 11r is anchored on the panorama shielding plate 11, which interlocks with the panorama lever 13.

Moreover, middle lever 14 is joined to fulcrum pin 14j so that the lever 14 is allowed to pivot and slide. A fulcrum pin 13r is anchored on the panorama lever 13, which interlocks with the middle lever 14 at the fulcrum pin 13r. The sliding range of the panorama shielding plate 12 is regulated by fulcrum pins 12j within the boundaries of apertures or slots (unlabeled) of the panorama light shielding plate 12, but the fulcrum pins 12j do not act to stop the panorama shielding plate 12 until the interlocking component 1, is stopped by the regulation units 2p and 2f. Also, fulcrum pin 11r is anchored on the panorama shielding plate 11, which interlocks with the middle lever 14. The interlocking pin 13a which interlocks with the interlocking component 1 is anchored on the panorama lever 13.

As seen in FIG. 3, an external operation lever 7 is anchored on the interlocking component 1 and is sub-assembled in the bottom cover 6. Stopping units 1p and 1f are provided on the interlocking component 1. The movable range of the interlocking component 1 is regulated by regulation units 2p and 2f provided in the protrusion 2a of the I-board 2. The interlocking pin 13a interlocks with the interlocking component 1. In the position in which the stopping unit 1p is stopped by the regulation unit 2p, the panorama light shielding plates 11 and 12 shield light at the top and the bottom sections of the standard field frame 10f and form the panorama size, establishing the panorama field shooting state.

In FIG. 4, the stopping unit if is stopped by the regulation unit 2f. In this position, the panorama light shielding plates 11 and 12 are positioned in the top and the bottom sections outside of the standard field frame 10f, hence light is not shielded inside the standard field frame 10f, establishing the standard field shooting state.

In the above discussion, the embodiment of the present invention describes a camera capable of switching between the standard size and the panorama size for the shooting size. However, the present invention is not limited to switching between the standard size and the panorama size, and is equally effective for a camera in which shooting size is switched to other sizes, including any specific sizes, such as the high-vision size and the half size.

In the above discussion, the embodiment of the present invention describes a camera with panorama light shielding plates. However, the present invention is not limited to two panorama light shielding plates, and any number of plates could be provided for shielding light.

In the above discussion the embodiment of the present invention describes an operation member with two grooves. However, the present invention is not limited an operation member with two grooves, and any number of grooves could be provided in the operation member.

Also, in the embodiment described above, the support means is described with at least one protrusion. However, the present invention is not limited to one protrusion on the support means and any number of protrusions could be provided.

The present invention permits various components to be subassembled, however, in no particular order. For example, interlocking component 1 and external operation lever 7 may be subassembled onto the bottom cover 6 prior to the final assembly of the camera. Similarly, prior to the final assembly of the camera, the light shielding plates and the levers 13 and 14 may be provided on the fulcrum pins of the shutter. Therefore, the various components of the camera may be subassembled to facilitate the final assembly of the camera. The order of subassembly and assembly are not limiting to the structure of the present invention. Various changes in the assembly may be made without departing from the spirit and scope of the invention as defined in the claims.

With the invention as described above, because a first regulation means regulates the movement range of the operation member relative to the support member, accurate switching of shooting size is possible. Further, because a second regulation means regulates the movement range of the light shielding member, large movement of the light shielding member is prevented even before the elements are joined together.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A variable field shooting size camera capable of switching the shooting size, comprising:

movable operation means for switching the shooting size;

at least one light shielding means interlocking with the operation means to move with the operation means for switching the shooting size;

support means for supporting the light shielding means and for enabling movement of the light shielding means; and first regulation means for regulating the movement range of the operation means relative to the support means; wherein the first regulation means extends from and cooperates with the support means for regulating the movement range of the operation means.

2. A variable field shooting size camera according to claim 1, further comprising:

second regulation means for regulating the movement range of the at least one light shielding means, wherein the movement range of the at least one light shielding means includes the movement range of the operation means.

3. A variable field shooting size camera according to claim 1, wherein the first regulation means comprises at least one groove provided in the operation means and at least one protrusion provided in the support means and extending into the at least one groove of the operation means.

4. A variable field shooting size camera according to claim 2, wherein:

the second regulation means comprises at least one aperture provided in the at least one light shielding means and at least one protrusion provided in the support means and sliding within the at least one aperture of the at least one light-shielding means.

5. A variable field shooting size camera according to claim 3, wherein:

the support means is fixedly attached to the camera.

6. A variable field shooting size camera according to claim 3, wherein:

the camera includes a cover;

the operation means includes an operating lever means for manually moving the operation means; and the operating lever means is located externally of the cover of the camera and extends through the cover.

7. A variable field shooting size camera according to claim 6, wherein:

the at least one groove is provided internally of the cover of the camera.

8. A variable field shooting size camera according to claim 3, wherein:

the at least one protrusion provided in the support means includes at least two regulation units cooperating with the at least one groove provided in the operation means for regulating the movement range of the operation means relative to the support means.

9. A variable field shooting size camera according to claim 3, wherein:

the at least one groove provided in the operation means includes at least two stopping units cooperating with the at least one protrusion for regulating the movement range of the operation means relative to the support means.

10. A variable field shooting size camera according to claim 3, wherein:

the at least one protrusion provided on the support means includes at least two regulation units;

the at least one groove provided on the operation means includes at least two stopping units;

wherein each of the at least two regulation units cooperate with a respective one of the at least two stopping units for regulating the movement range of the operation means relative to the support means.

11. A variable field shooting size camera according to claim 4, wherein:

the at least one protrusion includes a plurality of protrusions.

12. A variable field shooting size camera according to claim 4, wherein:

the at least one aperture includes a plurality of apertures.

13. A variable field shooting size camera according to claim 4, wherein the at least one light shielding means includes at least two light shield members, the at least two light shield members includes at least a first light shield member on one side of the shutter and at least a second lower light shield member on an opposite side of the shutter.

14. A variable field shooting size camera according to claim 13, wherein:

at least one aperture is provided in each of the at least two light shielding members.

15. A variable field shooting size camera according to claim 14, wherein:

at least one of the at least one protrusion extends through the at least one aperture of the at least first light shield member and also extends through the at least one aperture of the at least second light shield member.

16. A variable field shooting size camera according to claim 1, further including:

lever means for transmitting the movement of the operation means to the at least one light shielding means;

the lever means interconnected with the operation means at one end and the at least one light shielding means at another end.

17. A variable field shooting size camera according to claim 16, further including:

an other lever means, for further transmitting movement of the operation means to the at least one light shielding means;

the other lever means interconnected with the lever means at one end and the at least one light shielding means at the other end.

18. A variable field shooting size camera according to claim 17, further including:

the at least one light shielding means comprises at least two light shield members, the at least two light shield members including at least a first light shield member on one side of the shutter and at least a second light shield member on an opposite side of the shutter;

the lever means and the other lever means are provided with a slot at the end interconnecting with the respective one of the at least one light shielding means; and each of the at least two light shield members includes a protrusion cooperating with each respective slot, thereby permitting the movement of the lever means and the other lever means to move the at least one light shielding means.

19. A variable field shooting size camera comprising:

a shutter assembly that permits light to enter into the camera;

at least one light shield plate for varying the amount of light entering the shutter;

a lever for operating the at least one light shield;

an operating member for moving the lever; and a position regulator extending from the shutter assembly and cooperating with the operating member for regulating a movement range of the lever relative to the shutter.

20. A variable field shooting size camera according to claim 19, wherein the position regulator is a first position regulator, and further comprising a second position regulator in the shutter for regulating the movement range of the at least one light shield plate; and the movement range of the at least one light shield plate includes the movement range of the lever regulated by the first position regulator.

21. A variable field shooting size camera according to claim 19, wherein the position regulator is a first position regulator, and further comprising a second position regulator in the shutter for regulating the movement range of the at least one light shield plate; and completion of the movement range of the lever relative to the shutter by the first position regulator occurs before completion of the movement range of the at least one light shield plate by the second position regulator.

22. A variable field shooting size camera according to claim 19, wherein:

the at least one light shield plate includes at least a first light shield plate on one side of the shutter and at least a second light shielding plate on the opposite side of the shutter.

23. A method for switching the shooting size of a camera having an operating means movable to switch the shooting size, and at least one light shielding means interconnected to the operating means, the at least one light shielding means supported on a support means; the method comprising the steps of:

moving the operating means;

transmitting the movement of the operating means to the at least one light shielding means to move the at least one light shielding means to switch the shooting size of the camera; and regulating a movement range of the operating means relative to the support means to limit the movement of the operating means by extending means from the support means to cooperate with the operating means and the support means.

24. A method for switching the shooting size of a camera according to claim 23, further including the step of:

regulating the movement range of the at least one light shielding means, wherein the movement range of the at least one light shielding means includes the movement range of the operating means.

25. A method for switching the shooting size of a camera according to claim 23, wherein the at least one light shielding means includes a first light shield on one side of a shutter and a second light shield on an opposite side of the shutter, and the step of moving of the at least one light shielding means includes the steps of:

reciprocating the first and second light shields.

26. A method for switching the shooting size of a camera according to claim 24, wherein movement of the operating means relative to the support means reaches a limit of the movement range of the operating means before the movement of the at least one light shielding means reaches a limit of the movement range of the at least one light shielding means.

27. A method for switching the shooting size of a camera according to claim 23, wherein the step of regulating the movement range of the operating means relative to the support means includes the step of:

moving the operating means in one direction until at least a surface of at least one groove in the operating means abuts at least one projection of the support means.

28. A method for switching the shooting size of a camera according to claim 27, further including the steps of:

moving the operating means in an opposite direction until another surface of the at least one groove abuts the at least one projection of the support means.

29. A method for switching the shooting size of a camera according to claim 24, wherein the step of regulating the movement range of the at least one light shielding means includes the steps of:

moving the at least one light shielding member whereby the at least one protrusion in the support means interacts with a boundary of at least one aperture in the at least one light shielding means.

* * * * *